Feb. 24, 1931. O. J. MEYERS 1,793,709
FURNITURE
Filed March 12, 1928
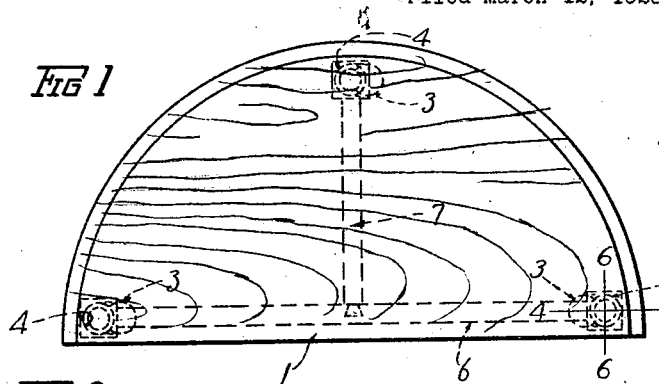
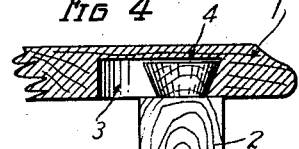
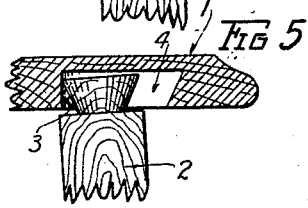
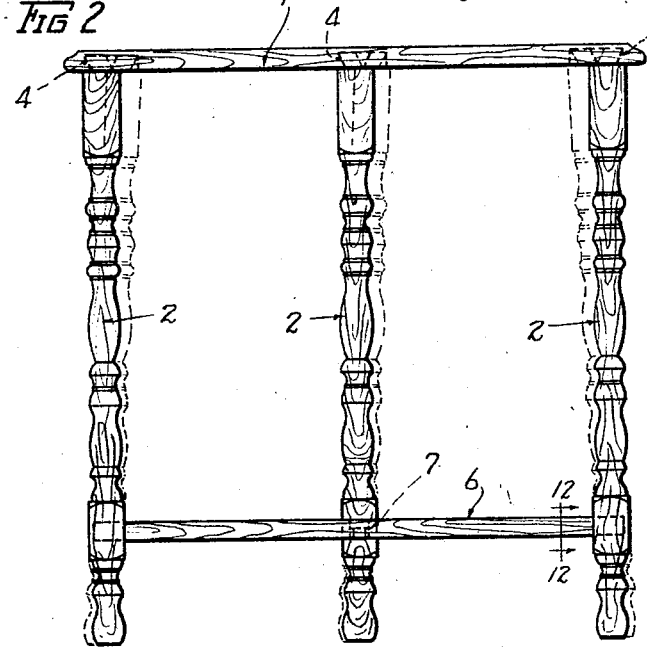
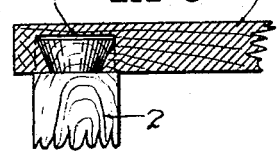
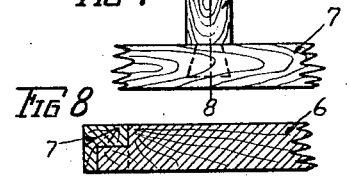
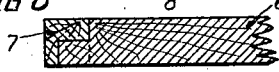
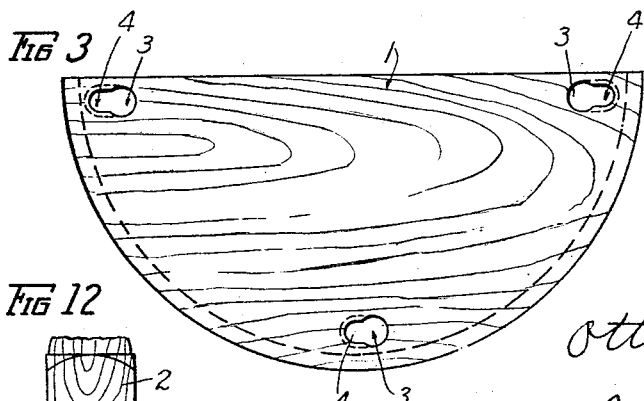
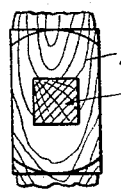
Inventor
Otto J. Meyers
By Staley & Welch
Attorneys Patented Feb. 24, 1931

1,793,709

UNITED STATES PATENT OFFICE

OTTO J. MEYERS, OF FREDERICKTOWN, OHIO, ASSIGNOR, BY MESNE ASSIGNMENTS, TO SUN GLOW INDUSTRIES, INC., OF MANSFIELD, OHIO, A CORPORATION OF OHIO

FURNITURE

Application filed March 12, 1928. Serial No. 261,011.

This invention relates to improvements in knock-down furniture such as tables, stands or the like employing supporting legs, it more particularly relating to the means for fastening the legs to the top of the table, stand or other article.

An object of the invention is to provide a table, stand or other article of furniture employing supporting legs which may be manufactured and shipped in knock-down state and be easily and readily assembled by the purchaser without the use of glue, nails, screws or other fastening means of that character.

In the accompanying drawings:

Fig. 1 is a top plan view of a table in which the improvements are embodied.

Fig. 2 is a front elevation of the same.

Fig. 3 is a bottom plan view of one of the parts.

Fig. 4 is an enlarged sectional view on the line 4—4 of Fig. 1.

Fig. 5 is an enlarged sectional view of the parts shown in Fig. 4, but in a different position.

Fig. 6 is an enlarged sectional view on the line 6—6 of Fig. 1.

Fig. 7 is an enlarged fragmentary top plan view showing a method of joining the bracing members.

Fig. 8 is an enlarged sectional view on the line 8—8 of Fig. 7.

Fig. 9 is an enlarged fragmentary end view of a modification of the method of joining the bracing members.

Fig. 10 is an enlarged fragmentary sectional view on the line 10—10 of Fig. 9.

Fig. 11 is an enlarged sectional view showing a modification of the method of joining together parts of the article.

Fig. 12 is an enlarged sectional view on the line 12—12 of Fig. 2.

In the present case, I have shown my invention applied to a three-legged table generally known as an end table, but it should be understood that the invention is equally applicable to other forms of tables or stands or other articles of furniture of that nature employing any desired number of legs.

Referring to the drawings, 1 represents the top of the table and 2 the legs. For the purpose of securing the legs to the under side of the top, the top is provided with a peculiarly shaped cavity for each leg which is tooled in the bottom side of the top as illustrated in Figs. 3, 4, 5 and 6. Each cavity is of elongated form having its bottom of uniform width, but one end of the cavity as indicated at 3 is formed with vertical sides, while the other end of the cavity 4 is dovetailed, each end of the cavity being formed on the arc of a circle as shown.

Each of the legs has its upper end formed with a reduced projection shaped like an inverted frustum of a cone to conform to the shape and size of the dovetailed portion 4 of the cavity, the greatest diameter of this projection being substantially that of the width of the cavity. This projection is readily insertable in the portion 3 of the cavity and can then be slid sidewise into the dovetailed portion of the cavity so as to interlock therewith.

Braces 6 and 7 secured to the legs near the lower end are preferably employed to brace the legs and make a rigid structure. In the present case one of these braces 6 extends between two of the legs and the other brace 7 between the brace 6 and the third leg, but any desired form of bracing may be employed for tables employing a lesser or greater number of legs. In connecting the braces with the legs, however, it is essential that the connections be such as to permit the upper ends of the legs to have the necessary sidewise movement to move the projection 2' from the portion 3 of the cavity to the dovetailed portion thereof. To that end the brace 6 is connected to the respective legs by providing each leg with an opening tooled from the inside of a size to receive the end of the brace with a snug fit. The brace 7 is similarly connected with its corresponding leg, but is connected with the brace 6 by providing the end of the brace 7 with a tapered projection 8 fitting a dovetailed recess 9 tooled from the bottom of the brace 6 so as to make a dovetailed joint as shown in Figs. 7 and 8. While the joints between the braces and legs and between the braces are snug ones, yet the necessary movement of the upper portion of the legs while being inserted into the dovetailed portions of the cavities of the table top is readily permitted.

Another way of securing the two braces together is shown in Figs. 9 and 10 in which the end of the brace 7 is provided with a reduced rounded portion 10 fitting in a rounded opening 11 in the brace 6.

In Fig. 11 is shown a modification in the manner of securing the legs to the table top in which it will be seen that the projection on the leg, indicated at 2″ is oppositely tapered from the center of its height and that portion 4 of the cavity which interlocks with it is similarly formed as indicated at 4′.

While in the present case braces or stretchers for the legs are employed yet it should be understood that these braces are not absolutely essential to the structure, as good results in providing a rigid table could be secured by my manner of securing the legs to the top in the absence of any braces or stretchers such as shown.

To assemble the structure the braces are first attached to the legs and then the legs secured to the top.

By this arrangement it will be seen that a construction is provided for a piece of furniture such as a table, stand or other article of that class having supporting legs by which the furniture can be manufactured and shipped in knock-down state and be readily assembled in the home of the purchaser or user without the use of tools and also without the employment of glue, nails, screws or other fastening devices of that nature.

In the present case, the braces 6 and 7 are of such length that the legs when assembled will stand in substantially vertical position. If desired, however, it is obvious that these braces may be made slightly longer than shown so that they will act to bind the interengaged portions of the legs and top into firmer engagement.

Having thus described my invention, I claim:

1. In an end table, a top having a straight side and a curved side, the under surface of said top adjacent the straight side thereof being provided with a pair of dovetailed grooves, one groove adjacent each end of said straight side, the under surface of said top being also provided adjacent the intermediate part of the curved side thereof with a third dovetailed groove three legs, the upper portions of said legs being shaped to conform to the dovetailed grooves, one end of each groove being approached by a recess large enough to receive the upper portion of a leg and having a uniform depth equal to the depth of the groove, a brace connecting those legs which are to be positioned at the straight side of said top, and a second brace connecting the leg positioned at the curved side of said top with said first mentioned brace, the connection between said braces being a detachable one.

2. In an end table, a top having a straight side and a curved side, the under surface of said top adjacent the straight side thereof being provided with a pair of dovetailed grooves each approached by an enlarged recess having a uniform depth equal to the depth of the groove, a pair of legs together with a brace connecting the lower ends thereof, the upper ends of said legs being conformed to the shape of the dovetailed grooves, the dovetailed grooves being separated by a distance equal to the distance between the upper ends of said legs when in normal supporting position, the under side of said top also having a third dovetailed groove approached by an enlarged recess of a uniform depth equal to the depth of the recess, and located adjacent the intermediate portion of the curved side of said top and extending in a plane parallel with the planes of the other two grooves, a third leg having its upper end conforming to the shape of the third dovetailed groove, and a second brace detachably connecting said third leg and said first mentioned brace.

3. In an end table, a top having a straight side and a curved side, the under surface of said top adjacent the straight side thereof being provided with a pair of dovetailed grooves each approached by an enlarged recess having a uniform depth equal to the depth of the groove, a pair of legs together with a brace connecting the lower ends thereof, the upper ends of said legs being conformed to the shape of the dovetailed grooves, the dovetailed grooves being separated by a distance equal to the distance between the upper ends of said legs when in normal supporting position, the under side of said top also having a third dovetailed groove approached by an enlarged recess of a uniform depth equal to the depth of the recess, and located adjacent the intermediate portion of the curved side of said top and extending in a plane parallel with the planes of the other two grooves, a third leg having its upper end conforming to the shape of the third dovetailed groove, and a second brace detachably connecting said third leg and said first mentioned brace, the connection between the braces consisting of an opening in one brace and a tenon on the other brace arranged to be inserted in said opening.

In testimony whereof, I have hereunto set my hand this 8th day of March, 1928.

OTTO J. MEYERS.